Oct. 23, 1956  E. FERMI ET AL  2,768,134
TESTING MATERIAL IN A NEUTRONIC REACTOR
Filed Aug. 28, 1945  3 Sheets-Sheet 1

Witnesses:

Inventors:
Enrico Fermi
Herbert L. Anderson
By:
Attorney

United States Patent Office

2,768,134
Patented Oct. 23, 1956

2,768,134

TESTING MATERIAL IN A NEUTRONIC REACTOR

Enrico Fermi, Santa Fe, N. Mex., and Herbert L. Anderson, Hartford, Conn., assignors to the United States of America as represented by the United States Atomic Energy Commission Application August 28, 1945, Serial No. 613,156

1 Claim. (Cl. 204—154)

Our invention relates to the general subject of nuclear fission and more particularly to a means and method for testing materials by means of a self-sustaining nuclear chain reaction system. Such a chain reaction system may be created by the nuclear fission of uranium by thermal neutrons, utilizing natural uranium having a $U^{235}$ isotope content of as low as the natural ratio of approximately 1/139 of $U^{238}$ or an enriched uranium having a higher $U^{235}$ content.

It is known that the isotope $U^{235}$ in natural uranium can be split or fissioned by bombardment with thermal neutrons, i. e., neutrons at or near thermal equilibrium with the surrounding medium, and it has been found possible to obtain a self-sustaining chain reacting system operating at high neutron densities. In such a system, the fission neutrons produced give rise to new fission neutrons in sufficiently large numbers to overcome the neutron losses in the system. Since the result of the fission of the uranium nucleus is the production of two lighter elements with great kinetic energy, plus approximately 2 fast neutrons on the average for each fission along with beta and gamma radiation, a large amount of power can be made available in such a self-sustaining system.

However, most of the neutrons arising from the fission process are set free with the very high energy of above one million electron volts average and are therefore not in condition to be utilized efficiently to create new thermal neutron fissions in $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross-section of $U^{235}$, to produce fission, rises a great deal more than the simple capture cross-section of $U^{238}$; so that under the stated circumstances the fast fission neutrons, after they are created, must be slowed down to thermal energies before they are most effective to produce fresh fission by reaction with additional $U^{235}$ atoms. In certain systems in which neutrons are slowed down without much absorption until they reach thermal energies and then mostly enter into uranium rather than into any other element, a self-sustaining nuclear chain reaction can be obtained, even with natural uranium. Light elements, such as deuterium, beryllium, oxygen or carbon, the latter in the form of graphite, can be used as slowing agents. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Carbon in the from of graphite is a relatively inexpensive, practical, and readily availble agent for slowing fast neutrons to thermal energies and our invention will be described as embodied in a graphite and uranium system, although it is equally applicable to other systems.

However, in order for the premise to be fulfilled that the fast fission neutrons be slowed to thermal energies in a slowing medium without too large an absorption in the $U^{238}$ isotope of the uranium, certain types of physical structure should be utilized for the most efficient reproduction of neutrons, as precautions must be taken to reduce various neutron losses and thus to conserve neutrons for the chain reaction if a self-sustaining system is to be attained.

The ratio of the number of fast neutrons produced by the fissions, to the original number of fast neutrons creating the fissions, in a system of infinite size using specific materials is called the reproduction or multiplication factor of the system and is denoted by the symbol K. If K can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio $r$ in a system of finite size differs from K by the leakage factor, and must be sufficiently greater than unity to permit the neutron density to rise exponentially. Such a rise will continue indefinitely if not controlled at a desired density corresponding to a desired power output.

During the interchange of neutrons in a system comprising bodies of uranium of any size in a slowing medium, neutrons may be lost in four ways: by absorption in the uranium metal or compound without producing fission, by absorption in the slowing down material, by absorption in impurities present in the system, and by leakage from the system. These losses will be considered in the order mentioned.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates the isotope $U^{239}$ which by two successive beta emissions forms the relatively stable nucleus $94^{239}$. It is not to be confused with absorption or capture of neutrons by impurities, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic, or combined uranium, but because the absorbing power of $U^{238}$ nuclei for neutrons of certain particular energies is inherently so high that practically all neutrons that already happen to have these energies, called resonance energies as explained above, are absorbed almost immediately upon their arrival in the body of uranium metal or uranium compound, and thus in effect are absorbed at the surface of such body. Volume resonance absorption is due to the fact that some neutrons make collisions inside the uranium body and may thus arrive at resonance energies therein. After successfully reaching thermal velocities, about 40 percent of the neutrons are also subject to capture by $U^{238}$ without fission, to produce $U^{239}$ and eventually $94^{239}$.

It is possible, by proper physical arrangement of the materials, to reduce substantially uranium resonance absorption. By the use of light elements as described above for slowing materials, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons are diffusing through the slowing medium over random paths and distances so that the uranium is not only exposed to thermal neutrons but also to neutrons of energies varying between the emission energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium relative to the amount of slowing material (i. e., the amount of slowing medium remaining unchanged) will reduce surface absorption, and any such reduction in surface absorption will release neutrons to enter directly into the chain reaction, i. e., will increase the number of neutrons available for further slowing and thus for reaction with $U^{235}$ to produce fission.

For a given ratio of slowing material to uranium, surface resonance absorption losses of neutrons in the uranium can be reduced by a large factor from the losses occurring in a mixture of fine uranium particles and a slowing medium, if the uranium is aggregated into substantial masses in which the mean spatial diameter is at least 1 centimeter for natural uranium metal and when the mean spatial diameter of the bodies is at least 2.4 centimeters for the oxide of natural uranium ($UO_2$). An important gain is thus made in the number of neutrons made directly available for the chain reaction. A similar gain is made when the uranium has more than the natural content of fissionable material. Consequently, we place the uranium in the system in the form of spaced uranium masses or bodies of substantial size, preferably either of metal, oxide, carbide, or combinations thereof. The uranium bodies can be in the form of layers, rods or cylinders, cubes or spheres, or approximate shapes, dispersed throughout the graphite, preferably in some geometric pattern. The term geometric is used to mean any pattern or arrangement wherein the uranium bodies are distributed in the graphite or other moderator with at least either a roughly uniform spacing or with a roughly systematic non-uniform spacing, and are at least roughly uniform in size and shape or are systematic in variations of size or shape to produce a volume pattern conforming to a roughly symmetrical system. The structure of uranium and slowing material is hereinafter called a neutronic reactor. It is sometimes known as a "pile."

The number of neutrons made directly available to the chain reaction by aggregating the uranium into separate bodies spaced through the slowing medium is a critical factor in obtaining a self-sustaining chain reaction utilizing natural uranium and graphite. The reproduction factor K of a mixture of fine uranium particles in graphite, assuming both of them to be theoretically pure, would only be about .785. Actual K factors as high as 1.07 have been obtained using aggregation of natural uranium metal in the best known geometry, and with as pure materials as it is presently possible to obtain.

Assuming theoretically pure carbon and theoretically pure natural uranium metal, both of the highest obtainable densities, the maximum possible K factor theoretically obtainable is about 1.1 when the uranium is aggregated with optimum geometry. Still higher K factors can be obtained by the use of aggregation in the case of uranium having more than the naturally occurring content of fissionable elements. Adding such fissionable material is termed enrichment of the uranium.

The thermal neutrons are also subject to capture by the slowing material. While carbon has a very small capture cross-section for thermal neutrons, and deuterium still smaller, an appreciable fraction of thermal neutrons (about 10 percent of the neutrons present in the system under best conditions with graphite) is lost by capture in the slowing material during diffusion therethrough. It is, therefore, desirable to have the neutrons reaching thermal energy promptly enter uranium.

In addition to the above-mentioned losses, which are inherently a part of the nuclear chain reaction process, impurities present in both the slowing material and the uranium add a very important neutron loss factor in the chain. The effectiveness of various elements as neutron absorbers varies tremendously. Certain elements such as boron, cadmium, samarium, gadolinium, and some others, if present even in a few parts per million, could very likely prevent a self-sustaining chain reaction from taking place. It is highly important, therefore, to remove as far as possible all impurities capturing neutrons to the detriment of the chain reaction from both the slowing material and the uranium. If these impurities, solids, liquid, or gaseous, and in elemental or combined form, are present in too great quantity, in the uranium bodies or the slowing material or in, or by absorption from, the free spaces of the system, the self-sustaining chain reaction cannot be attained.

It is therefore an object of this invention to provide a method and means of testing materials in order to determine the neutron absorption of said materials.

Another object of this invention is to provide a quick, simple method whereby material may be introduced into an operating nuclear chain reaction system and the effect of said material on the nuclear chain reaction of the system may be determined.

The amounts of impurities that may be permitted in a system, vary with a number of factors, such as the specific geometry of the system, and the form in which the uranium is used—that is, whether natural or enriched, whether as metal or oxide—and also factors such as the weight ratios between the uranium and the slowing down material, and the type of slowing down or moderating material used—for example, whether deuterium, graphite or beryllium. Although all of these considerations influence the actual permissible amount of each impurity material, by the use of our method and apparatus, the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above.

The effect of impurities on the optimum reproduction factor K has in the past been approximated by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the reproduction factor K as calculated for pure materials and for the specific geometry under consideration. In order to use this method the kind and amount of each impurity must be determined. This is difficult because even tracer amounts of certain impurities have a considerable effect on the reproduction factor K. However, by the use of our method the total reduction in K factor for a specific material containing impurities may be ascertained quickly and accurately without the necessity for analyzing the material either qualitatively or quantitatively.

The strong absorbing action of some elements renders a self-sustaining chain reacting system capable of control. By introducing neutron absorbing elements in the form of rods or sheets into the interior of the system, for instance in the slowing material between the uranium masses, the neutron reproduction ratio of the system can be changed in accordance with the amount of absorbing material exposed to the neutrons in the system. A sufficient mass of an absorbing material can readily be inserted into the system to reduce the reproduction ratio of the system to less than unity and thus stop the reaction.

For instance, in one system, which will be further described hereinafter, the reproduction ratio is controlled by inserting a long, thin cadmium rod called a control rod a chosen distance into a transverse slot near the center of the structure. Such a rod may be calibrated in convenient units and we have discovered that by inserting a sample of a material to be tested into the chain reacting system and ascertaining the amount of the cadmium rod that must be inserted into the system to bring said system to a desired reproduction ratio, the effect of the sample on the reproduction factor of the system may be determined.

It is thus another object of our invention to provide a method and means of determining the effect of a change in the materials or the structure of a chain reacting system on the reproduction factor K of said system.

When the uranium and the slowing material are of such purity and the uranium is so aggregated that fewer neutrons are parasitically absorbed than are gained by fission, the uranium will support a chain reaction producing an exponential rise in neutrons density if the overall size of the system is sufficiently large to overcome the loss of neutrons escaping from the system. Thus the overall size is important.

The size of the system will vary, depending upon the K factor of the system, and upon other things. If the reproduction factor K is greater than unity, the number of neutrons present will increase exponentially and indefinitely except as affected by a temperature effect, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to the volume becomes less as the structure is enlarged.

In the case of a spherical structure employing uranium bodies imbedded in graphite in the geometries disclosed herein and without an external reflector the following formula gives the critical overall radius (R) in feet:

$$K-1=\frac{C_2}{R}$$

where C is a constant that varies slightly with geometry of the lattice and for normal graphite lattices may have a value of the order of 7 to 8.

For a rectangular parallelepiped structure rather than spherical, the critical size can be computed from the formula $$K-1=C\left(\frac{1}{a^2}+\frac{1}{b^2}+\frac{L}{c^2}\right)$$

where $a$, $b$, and $c$ are the lengths of the sides in feet. The critical size for a cylindrical structure is given by the formula, irrespective of the shape of the uranium bodies, in which $h$=cylinder height in feet, and $R$=radius in feet:

$$K-1=C\left(\frac{1}{h^2}+\frac{.59}{R^2}\right)$$

However, when merely critical size is attained, by definition no rise in neutron density can be expected. It is therefore necessary to increase the size of the structure beyond the critical size but not to the extent that the period for doubling of the neutron density is too short, as will be explained later. A desirable reproduction ratio ($r$) for an operating structure with all control absorbers removed and at the temperature of operation is about 1.005. The size at which this reproduction ratio can be obtained may be computed from modifications of the above formulae for critical size. For example, for spherical active structures the formula $$K-R=\frac{C}{R^2}$$

may be used to find R when K is known and $r$ is somewhat over unity. The same formula will, of course, give $r$ for given structures for which K and R are known.

As stated above the period for doubling of intensity must not be too short. If it were too short the reactor would be incapable of control. Control by means of a neutron absorber such as a cadmium rod is feasible only because of the fact that when fission takes place all of the neutrons emitted do not leave the $U^{235}$ immediately. Instead from about 0.05 percent to 1 percent of the neutrons are emitted up to several minutes after fission takes place. Half of these "delayed" neutrons are emitted in six seconds and 90 percent within 45 seconds. The mean time of delayed emission is about 5 seconds. The fact that this percentage of neutrons is delayed, imparts a slowness of response to the reactor that would not be present if all the neutrons were emitted instantaneously. Therefore, for ease of control the reproduction ratio $r$ with all control absorbers removed is kept about 1.005; the excess of 0.005 being within the percentage of delayed neutrons.

Critical size may be attained with a somewhat smaller structure by utilizing a neutron reflecting medium surrounding the surface of the active structure. For example, a two foot thickness of graphite having low impurity content, completely surrounding a spherical structure is effective in reducing the diameter of the uranium bearing portion by as much as 2 feet, resulting in a considerable saving of uranium or uranium compound.

For further consideration of the theory and characteristics of neutronic reactor systems, reference is made to the copending application of Enrico Fermi and Leo Szilard, Serial No. 568,904, filed December 19, 1944, now Patent No. 2,708,656 issued May 17, 1955.

We will further describe one embodiment of our invention as used with a carbon moderated chain reacting system using uranium oxide and uranium metal for the fissionable material. The objects and advantages of our invention will become apparent from the following description read in conjunction with the drawings, in which:

Fig. 5 is an enlarged plan view partially in cross-section of one of the uranium bearing graphite blocks of which the active portion of the reactor is constructed;

Fig. 6 is a side elevational view partially in cross-section taken on line 6—6 of Fig. 5;

Fig. 7 is a side elevational view partially in cross-section of one of the solid graphite blocks;

A self-sustaining chain reaction is not possible in graphite with natural uranium without aggregation. Such a chain reaction is possible with aggregation and we will describe a conductively cooled self-sustaining chain reacting system, in which both natural uranium metal and natural uranium oxide ($UO_2$) bodies are utilized, imbedded in high quality graphite and in which the active portion is roughly spherical.

Figure 1:
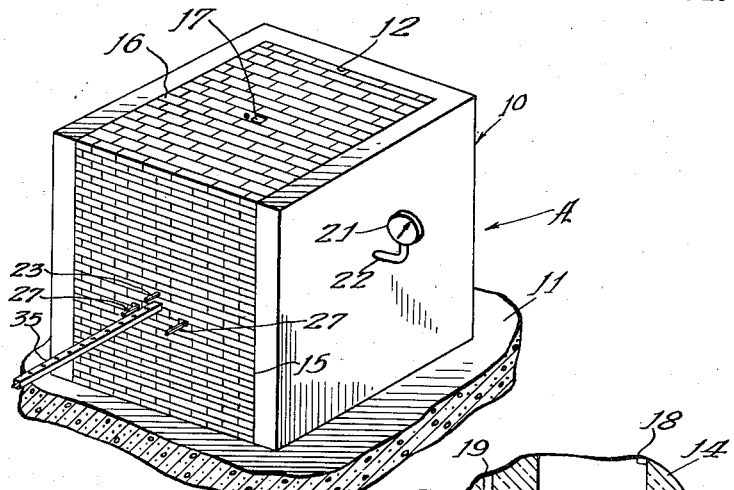
Fig. 1 is a perspective view of a neutronic reactor completely enclosed in a shield of concrete blocks.

Referring first to Fig. 1 illustrating the completed structure, side walls 10 are erected on a heavy foundation 11, both preferably of poured concrete about 5 feet thick, leaving a vault space 12 inside walls 10 in which is built up, as will be explained later, an active portion 13 (Fig. 2) surrounded by a graphite reflector 14. The sides of the structure are closed by a front wall 15, and a top 16 both 5 feet thick and formed of concrete bricks. The top covering is pierced by an aperture 17 leading to a well 18 extending to at least the peripheral layer of uranium bodies in the active portion 13. A second aperture is the exterior opening of a shaft 19 extending to the center of the structure. The well 18 and shaft 19 are used as neutron passageways when bodies outside the reactor are to be exposed to radiation.

Entering the side wall 10 opposite the central portion of active portion 13 is a slot at the end of which is positioned an ionization chamber 20 connected to a galvanometer 21 by wire line 22.

Figure 2:
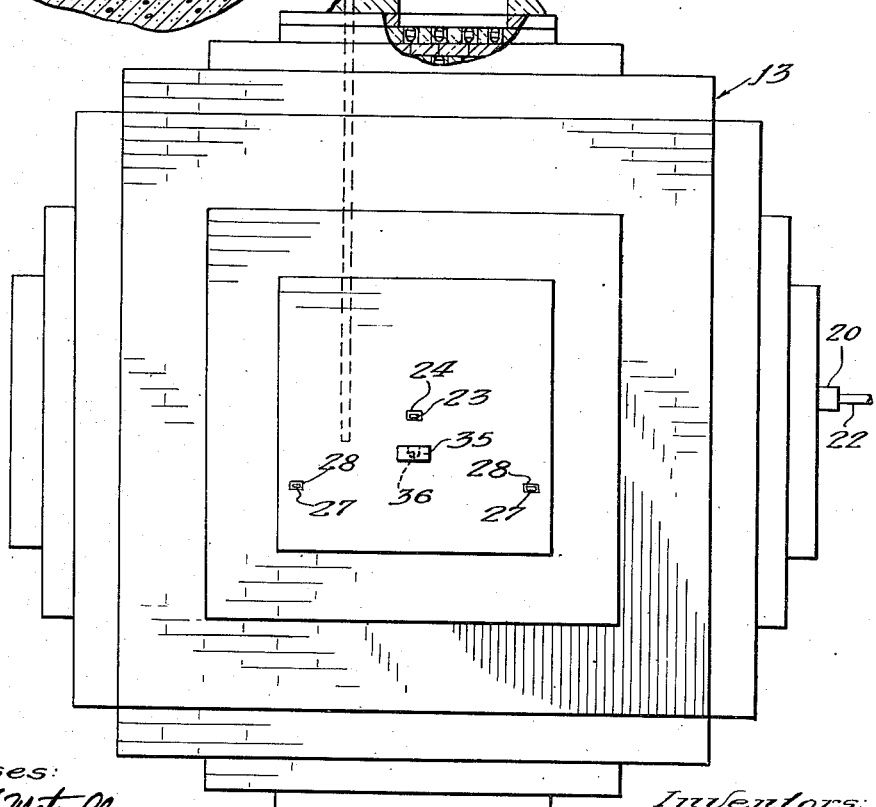
Fig. 2 is an enlarged elevational view partially in cross-section of the front face of the reactor with the shield removed.

Extending from the outside of the structure into the center of active portion 13 is a control rod 23 sliding in slot 24 in the graphite (Fig. 2). A scale 25 is provided on control rod 23 to indicate the depth of penetration of the control rod 23 into the active portion 13. Also extending into the active portion 13 through the front wall 15 are two spaced safety rods 27 operating in slots 28. Safety rods 27 and control rod 23 are preferably thin flat rods of cadmium, backed with aluminum for strength, and are arranged to move freely in and out of slots 28 and 24 respectively. This completes the overall structure of the device. The active portion 13 will next be described.

The self-sustaining chain reacting unit 13 to be built up within vault 12 is designed to so reduce neutron losses as to make a self-sustained chain reaction possible, as has been previously outlined, using specific types and sizes of uranium masses, both of metal and oxide in graphite, all of best obtainable purity, and spaced with a specific geometry. An all metal structure could be built, i. e., wherein all of the uranium bodies are of metallic uranium, but the combination of metal and oxide in the present example is utilized for economy, uranium metal being at present more expensive to produce than uranium oxide.

The graphite is in the form of blocks or bricks having dimensions of 4⅛″ x 4⅛″ x 16½″, these blocks having been planed by woodworking machinery to have smooth rectangular sides. Certain of the blocks 30 are drilled with two holes spaced 8¼″ center to center to receive the uranium bodies which are placed therein as shown in Figs. 5 and 6. These graphite blocks 30 are termed live graphite. Other blocks 31, as shown in Fig. 7, contain no uranium and may be termed dead graphite. The uranium bodies are in two forms, one form being cast uranium metal cylinders 32 having a density of about 18 grams per cubic cm., each cylinder being 2¼″ in diameter, and 2¼″ in height, weighing about 6 pounds each. The other uranium bodies 33 are in the form of pseudospheres of uranium oxide, $UO_2$, 3¼″ in diameter and slightly less than 3¼″ in height, similar to the metal cylinders with the exception of a beveling on top and bottom to approximate spherical contours weighing about 4.7 pounds each. The oxide in the pseudospheres is compressed to a density of about 6.1 grams per cubic cm. by hydraulic pressure.

Figure 3:
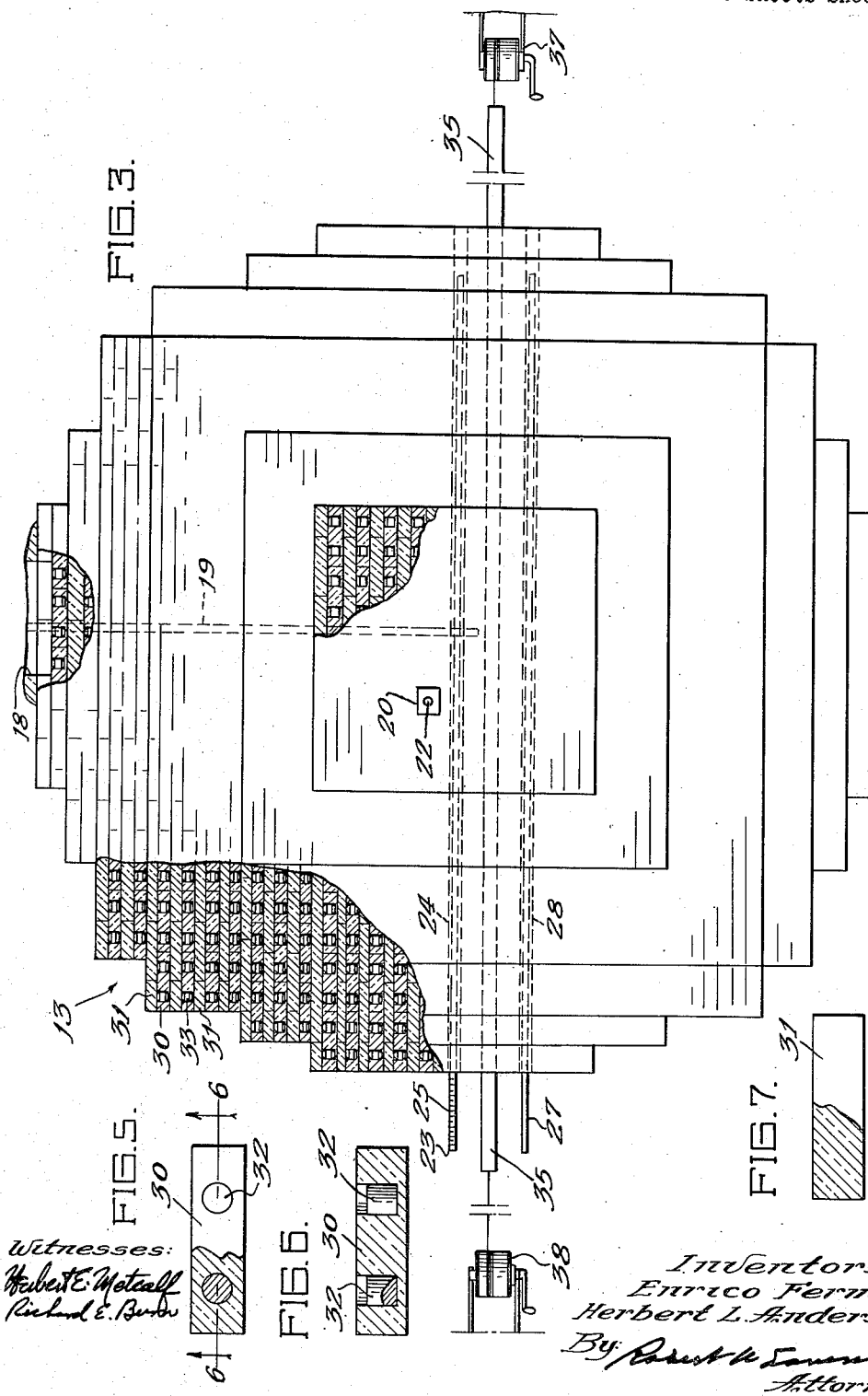
Fig. 3 is an enlarged side elevational view partially in cross-section of the neutronic reactor with the shield removed.
Figure 4:
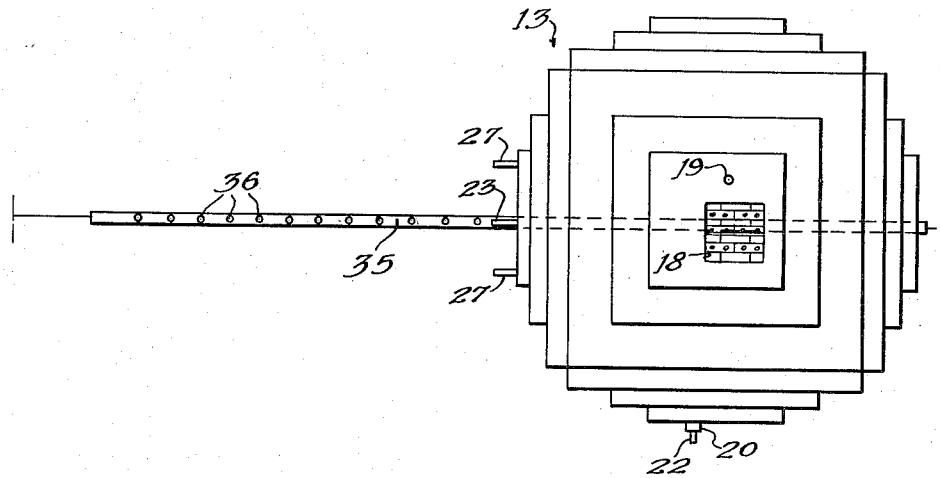
Fig. 4 is a plan view of the top of the reactor with the shield removed.
Figure 8:
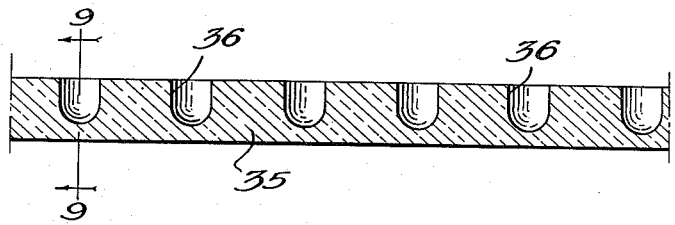
Fig. 8 is an enlarged longitudinal sectional view of the removable graphite stringer in which material to be tested is placed.
Figure 9:
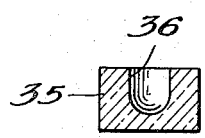
Fig. 9 is a cross-sectional view taken on line 9—9 of Fig. 8.

The active portion 13 of the structure, which is built inside the vault, has 75 layers of live graphite, alternating with layers of dead graphite to approximate a sphere having a diameter of approximately 24 feet. A total amount of graphite of approximately 290 tons is used in the active portion. Approximately 6 tons of cast uranium metal bodies are used for the cylinders. This metal, being more effective in the reaction, is placed at the center of the active structure 13 with the oxide pseudospheres concentrically arranged around the metal bearing center as shown in cut-away portions in Fig. 3. Approximately 40 tons of compressed oxide bodies are used, and the total number of uranium bodies is about 20,000, of which 2,000 are metal. The volume ratio of the metal containing section is about 60 carbon to 1 uranium and of the oxide containing section approximately 25 carbon to 1 uranium considered as oxide in the described compressed form.

The spacing of the uranium elements in the graphite is such that each unit cell comprising one uranium body and surrounding graphite has a side size of 8¼″ and a volume of 0.324 cubic foot. The arrangement of the bodies in the graphite is that of a simple cubic lattice of the uranium bodies. The K factor for the metal bodies 32 and graphite is about 1.07, and for the oxide bodies 33 and graphite about 1.039, danger coefficients for both the graphite and the uranium included. The average K for the entire structure is about 1.05. Such a structure will sustain a chain reaction when assembled roughly in the shape of a sphere approximately 24 feet in average diameter and when surrounded by a suitable neutron reflector of dead graphite.

The actual construction of the neutronic reactor is started by placing on the foundation of vault 12, several layers of dead graphite blocks to start reflector 14, after which the active portion may be started by piling up alternate layers of dead graphite and live graphite, filling the edges of both live and dead layers out to the concrete side walls with dead graphite to continue the reflector 14. The blocks are closely packed, without cement, to eliminate air spaces as far as possible.

When slightly less than half the required number of layers have been piled in the vault, the slots 28 are provided in a dead carbon layer through which the safety rods slide, and the safety rods 27 installed. After a few more layers are added to the pile, the control slot 24 is built in, the control rod 23 inserted, and the ionization chamber 20 installed on the outer boundary of the active structure. Wire line 22 is led to the outside and connected by a monitoring circuit (not shown) to galvanometer 21.

Ionization chamber 20 comprises a sealed metal casing containing approximately 18 liters of boron trifluoride at one atmosphere pressure into which projects a central electrode not shown. The ionization chamber 20 is connected through a suitable circuit to galvanometer 21. Neutron absorption by the boron in the chamber releases alpha particles by nuclear reaction and causes alpha ray ionization in the chamber, the amount thereof being measured by galvanometer 21. The neutron density varies from the center of the reactor to the periphery, being highest in the center. However, to avoid poisoning of the pile by the material of the chamber it is placed at the periphery of the reactor. The density at the periphery is proportional to the density at other points in the reactor. The galvanometer deflection is only approximately linear with neutron density, but is reproducible and readily calibrated in terms of neutron density or power, if desired.

Construction is continued, layer by layer, with the control rod and safety rods fully inserted into the reactor. Along lines passing close to the center of the reactor, one or more removable stringers 35 of live carbon are provided so that one or more complete rows of uranium bodies can be removed from the reactor as may be desired for test purposes, as will later be described.

Stringer 35 is composed of one long block or several blocks of graphite secured together. It is slightly smaller in cross-section than carbon blocks 30 so that it may be easily moved in and out of the reactor. Depressions or cells 36 are formed in the stringer 35 for receiving material to be tested. The stringer may be conveniently made twice as long as the depth of the reactor so that one-half of said stringer is out of the reactor ready for loading or unloading while the other half is in said reactor. Winches 37 and 38 are used for pulling said stringer in and out of the reactor.

With the safety rods and control rods fully inserted into the structure, the active portion 13 and the reflector 14 are completed to the final size desired. The top 16 and front 15 are then closed with cement blocks. A structure is thus obtained having an active portion 13, surrounded by a carbon reflector 14 and enclosed in concrete walls on all sides except for the slots 24 and 28 through which the control and safety rods slide to the interior of the structure and slots for well 18 and shaft 19.

The graphite reflector 14 is used to reflect back into the active portion some of the neutrons that might otherwise diffuse out of the system. By using such a reflector the overall size of the reactor may be somewhat smaller than in a reactor where no reflector is employed because the neutron losses to the exterior are reduced.

The concrete walls serve as the main shield to prevent the escape of gamma radiation outside the structure as carbon, being a light material, absorbs gamma rays only to a small extent.

After the structure of the neutronic reactor has been completed, it is ready for operation, utilizing control by the control rod 23 described above. As has been explained, cadmium has a high danger coefficient and is a very good neutron absorber and therefore the greater the quantity of rod 23 in the reactor, the more neutrons that are absorbed. Even small increments of movement of the control rod into the reactor have an effect on the reproduction ratio $r$ of the reactor. To commence operation safety rods 27 are withdrawn entirely from the active portion 13 and the control rod 23 is then slowly withdrawn to a point where galvanometer 21 indicates that the neutron density is rising. If a faster rise is desired, the rod is retracted further to increase the reproduction ratio $r$ of the system.

When any desired neutron density is reached, the control rod is pushed back into the reactor until a point is found where the neutron density remains constant. At this point the system is balanced, with a neutron reproduction ratio $r$ of unity. No special source of neutrons is needed in the structure, as the natural neutrons always present and constantly diffusing through the reactor are sufficient to start the reaction.

To again increase the neutron density, the control rod is moved outwardly in such manner and to such extent that the neutron density rises at a desired rate and attains the new desired value, and then the control rod is moved in to the point where the system is again balanced, thus stabilizing the reaction at the new neutron density. If it is desired to decrease the neutron density, the control rod is pushed into the reactor until the reproduction ratio is less than unity and the neutron density decays to the desired value. Then the control rod is retracted to the position at which balance is reestablished. In this manner, any desired neutron density within the heat dissipating limits of the structure may be obtained and maintained. The position of the control rod in the system therefore does not govern the neutron density in the reactor, but only the rate of change of neutron density.

The reactor herein described has a maximum possible reproduction ratio $r$ of 1.0042, causing a doubling of the neutron density about every 8 seconds with the control and safety rods completely removed. This slow rise renders the system always easy to control and safe to operate. The low reproduction ratio in the system obtained from a geometry giving an overall K factor of 1.054 is due to the fact that the structure is close to the critical size and to the fact that large quantities of neutrons are deliberately permitted to leak from well 18 and shaft 19 for use outside the reactor.

The unity reproduction ratio position or "balanced" position of the control rod within the reactor for maintaining any desired neutron density would always be the same were it not for the fact that the temperature within the reactor changes to some extent and influences the neutron losses in the materials and also for the fact that in any reactor exposed to atmospheric pressure, changes in the nitrogen content of the reactor accompanying changes in atmospheric pressure, change the $r$ ratio, as nitrogen is an absorbing impurity. The unity reproduction ratio point on the control rod therefore changes slightly in accordance with the temperature of the reactor and with the atmospheric pressure. Changes due to temperature are relatively small and the balanced position of the rod can readily be calibrated for temperature effect.

If at any time it is desired to stop the reaction, the control rod is inserted deep within the reactor until the reproduction ratio becomes less than unity, i. e., less than the value necessary to maintain the reaction with this size of structure. The neutron density then decays to that of the natural neutrons multiplied by a factor of about 100 which is the inherent multiplication when the control and safety rods are inserted. If desired, the safety rods may be pulled into the system by weights tripped by an emergency latch in case of failure of the control rod to control the reaction for any reason. It is also possible to control the position of the control rod 23 by means of automatic connection to the monitoring circuit, although such automatic control forms no part of the present invention and is not required in the system described.

Having described the general structure and operation of a neutronic reactor, we will now describe how the reactor may be adapted for testing materials in accordance with our invention.

A "standard" batch of uranium cylinders is placed in one-half of the depressions 36 of "double length" removable stringer 35, and this loaded half of the stringer is moved into the reactor by means of winches 37 and 38. The reactor is then balanced by means of control rod 23 at any convenient neutron density.

While the reactor is being balanced, the second half of the stringer 35, which is outside of the reactor, is loaded with the metal to be tested. The weights of standard and test metal must be equal or a correction must be made for the inequality. The stringer 35 is then moved so that the standard metal is outside of the reactor and test metal is inside and the reactor is again balanced. If the control rod is further out of the reactor for equilibrium with the test metal in the reactor than it was with the standard metal in the reactor, then the test metal is parasitically absorbing more neutrons than did the standard metal. Therefore, said test metal is not as good for reactor construction as is the standard metal. However, if the control rod must be pushed further into the reactor to achieve equilibrium with the test metal in the reactor, then the test metal is parasitically absorbing less neutrons than did the standard metal. Corrections must be made for any change in barometric pressure or reactor temperature between readings of the control rod. The double length stringer 35 makes it possible to substitute material without stopping the neutronic reaction.

In order to determine quantitatively what the effect of the test metal is on the reproduction factor K, we have calibrated the control rod 23 in several different ways.

As the effect per inch movement of control rod 23 is greater for the portion of the control rod nearer the center of the reactor than it is for the portion near the edge, a unit may be chosen so that for movement of the control rod 23 one of said units will always have the same effect on the reproduction ratio of the reactor without regard to the depth of said rod in the reactor. Such a unit is the conventional inch sometimes called a "cinch." Any movement of the control rod the distance of one cinch has the same effect on the reproduction ratio of the reactor as a movement of the control rod one inch from the balanced position. In order to calibrate the rod in cinches, the reactor is balanced so that the neutron density is constant. The rod is then withdrawn one inch and the rate of rise of neutron density is measured by timing the interval necessary for the neutron density to double as shown on the galvanometer 21. The rod 23 is then withdrawn until the rate of rise is twice the amount just measured, and this position is marked "2 cinches." The same procedure is followed until the entire rod is calibrated in terms of cinches. If the atmoshperic pressure or reactor temperature should change during the calibration, a suitable correction must be made for said change. A movement of the control rod of the described reactor approximately 2.3 cinches has been found to equal a 1 percent change in the excess reproduction ratio $(r-1)$.

We have also calibrated the control rod in terms of a unit known as the "inhour." One inhour is the distance that the control rod must be moved from the critical or balanced position to give the reactor a period of one hour. The period of a neutronic reactor is by definition the time necessary for the neutron intensity to increase by a factor of "$e$" ($e=2.718$).

In order to calibrate the control rod 23 in inhours, it is necessary to determine the critical point of said control rod at which the reactor is balanced and then measure the period of various positions of the control rod. The period can be measured by taking a reading of neutron density on galvanometer 21 and then measuring the time necessary for this density to be multiplied by a factor of 2.718.

The relation between inhours and the period ($\Gamma$) of the reactor may be expressed approximately by:

i nhr. at balanced condition $-$ inhr. $=$ $$\frac{64}{\Gamma}+\frac{245}{\Gamma+3.57}+\frac{688}{\Gamma+10.1}+\frac{1938}{\Gamma+34.5}+\frac{665}{\Gamma+83}$$

This formula was derived from experiments on the described reactor. By substituting in said formula for the periods, and solving for inhours, the control rod 23 may be marked in inhours.

In measuring the period of the reactor, a correction must be made for any change in atmospheric pressure. As described above, the reactor is open to the atmosphere. Therefore, an increase in atmospheric pressure will cause an increase in the weight of air inside the reactor. Oxygen has a small danger coefficient and, therefore, does not absorb neutrons in great quantities, but nitrogen on the other hand has a larger danger coefficient and so the great quantity of nitrogen present in the reactor has a distinct effect on the reproduction ratio $r$. By experiment it has been found that a change in atmospheric pressure on the described reactor is equal to 0.323 inhour for a change of one millimeter of mercury for the standard atmospheric pressure of 760 mm. of mercury.

A rise in temperature of the reactor has an effect on the reproduction ratio that has been determined by experiment to reduce said ratio 0.814 inhour per degree centigrade for the described reactor.

Also by experiment a change in the average weight of metal in each cell 36 from a standard weight of 1900 grams has an effect for which a correction must be made. This correction may be expressed in inhours for this reactor by $$0.00535 \ (1900-w)$$

It may be explained that the procedure of the invention is greatly facilitated by calibration of the control rod or other control element or device of the reactor, in units significant of the reactivity, such as inhours (abbreviated "ih."). A very direct measure of the reactivity of a neutronic reactor is the period, i. e., the time for the neutron density to change by the factor "$e$" as explained hereinabove, and although the excess reproduction ratio $\Delta r$ (which is $r-1$, or the amount by which the ratio departs from unity when the reactor is unbalanced) bears a generally inverse relation to the period, it has been found more convenient in numerous testing operations to adopt a special unit that is porportional to $\Delta r$, and equal to the reciprocal of the period for small values of such reciprocal. A suitable unit of that character is the inhour, which as stated hereinabove is the amount of reactivity that gives the reactor a period of one hour.

In marking or calibrating the control rod in inhours, an appropriate zero point may be arbitrarily or otherwise adopted, for instance so that the zero inhour point represents the position of the control rod completely inserted into the reactor. Determinations of the period can be made for a multiplicity of rod positions between the position of normal balance (actually $r=1$) and the position of complete withdrawal, and by substituting values of the period ($\Gamma$) in seconds in the formula given above relative inhour values may be obtained for the selected positions of the rod. It will be noted that the formula gives the number of inhours by which the control rod departs from balanced condition and the actual markings for a rod are each equal to the calculated value of the formula (in inhours) for the point to be marked augmented by the inhour value of the position of normal balance. Although other methods may be followed, this procedure leads to the useful convention of considering an inward displacement of the control rod as representing a positive change in the number of inhours and withdrawal of the rod as representing a negative change. The readings of inhours for the balance point of the control rod represents the reactivity of the reactor; i. e., corresponds to the reproduction factor $k$: for example, if absorbing impurities other than the control rod are inserted in the reactor, its reactivity is reduced and the rod must be pulled out further in order to maintain the actual reproduction ratio at unity. The decrease in $k$ introduced by the absorption of the impurity may then be determined from the difference in the inhour readings of the control rod taken at balanced conditions both before and after the insertion of the impurity. The relation between change in number of inhours and change in position of the control rod may be called the "sensitivity" of the rod in inhours per centimeter and for the usual type of control rod differs in numerical value for different positions of the rod.

To obtain accurate markings for positions of the rod further inside the reactor than the normal critical or balance point, i. e. portions of the scale representing greater reactivity such as might be obtained by replacing portions of the reactor structure with superior materials tending to increase the value of $k$, and to determine the inhour reading for the position of normal balance, various procedures may be adopted as will now be apparent to those skilled in the art. For instance, if the operating neutron density at critical position is made high enough to permit significant readings of decay, one method is to make determinations of the time of decay of neutron intensity, as for decay by a factor of ($e$), corresponding to a multiplicity of rod positions where the actual reproduction ratio $r$ is less than unity, and then to substitute these determinations, as negative values of the period, in the formula for inhours.

A further way of making or checking the calibration of positions on both sides of the normal balance or critical point, involves measuring the neutron intensity at various localities along the control rod slot while the rod itself is held at the critical position. The neutron intensity may be measured with copper foils, as by determining the radioactivity, or "activity," induced in copper foils of a standard size and character. Taking the positions of the foils in the slot as corresponding, for example, to points on the control rod scale that would be indicated if the inner end of the rod were disposed successively at the foil positions, it is found that at least for a considerable range on either side of the balance point, the square of the copper foil activity is proportional, in first approximation, to the sensitivity of the control rod in inhours per centimeter. The proportionality constant can be determined by integrating this differential curve (i. e., the stated relation) from the zero position to a position at which a period determination was made and for which the number of inhours is thus known; in actual instances, such calculations made for a plurality of different period-determined positions have been in good agreement. Using the proportionality constant, a multiplicity of foil activity measurements can then be employed to extend or check the calibration of the control rod.

As explained above, in assigning values of inhours to various positions of the control rod, and in subsequently taking readings of control rod position in inhours, correction for pressure effect (i. e., decrease of $k$ or $r$ with rise of pressure) must be made in the use of a reactor that is not sealed from the atmosphere. Such corrections for the reactor shown can be conveniently computed for readings of pressure that are translated to an appropriate standard temperature; for example, the atmospheric pressure readings of a suitable barometer can be corrected to 0° C., and then the control rod readings or markings corrected to a selected standard pressure, e. g., 740 mm., as employed in the specific example and table set forth hereinbelow. As above stated, the pressure effect is such that a rise of pressure of one mm. of mercury produces such decrease of reproduction ratio as to require outward displacement of the control rod by 0.323 inhour to rebalance the reactor after such rise. Although the temperature effect is of corresponding magnitude per degree C. as stated hereinabove, circumstances of operation of the reactor may be such that its temperature changes are inconsequential during the period in which calibration is being effected, or during any series of testing operations.

For the specific reactor described, it has been found that the relation between the reproduction factor $k$ and the scale of inhours as marked on or for the control rod is such that one inhour corresponds to a change in $k$ for the reactor, or in the reproduction ratio $r$ (since the reproduction ratio may be considered as equal to $k$ diminished by a quantity representative of neutron leakage loss), of $3.04 \times 10^{-5}$. However, for most purposes of the tests made in accordance with the present invention, as where other structures or materials are compared in a removable stringer with a standard structure and material, it is desirable to as certain the change in $k$ for the type of cell under test, or in other words, to ascertain how the $k$ of a reactor would change if its entire structure were modified in the manner of the removable stringer, as compared with a reactor embodying throughout the material and structure utilized as a standard of comparison in the stringer. It will be understood that the reproduction factor is a constant that equally characterizes a unit cell comprising a uranium body and its surrounding portion of the moderator, or a group of such cells, or any reactor constituting a regular repetition of such unit cells.

It has advantageously been found that the changes of control rod position necessary to rebalance the reactor with various samples under test may be directly calibrated in change of $k$ for cells of the character tested, i. e., in the amount by which the reproduction factor of a reactor would be increased or decreased by appropriately utilizing, throughout the entire device, the material of the sample under test, and each such calibration may be employed for a variety of different tests. A simple example will serve to illustrate one manner of making a calibration of this sort: In a number of tests it was desired to investigate the characteristics of various uranium metal bodies. Sixteen cells, i. e., sixteen pockets 36 of the stringer 35 were used for the tests, and in the preliminary calibration alternate readings of control rod balance position were taken, with the 16 pockets first occupied by uranium bodies of a standard character, and then occupied by pressed bodies of uranium oxide ($UO_2$), it being understood that in such comparisons it is preferable to use oxide bodies providing a thermal neutron utilization equivalent to that of the metal bodies, in the reactor cells constituted when the stringer is in place. With appropriate pressure correction, the critical positions were found to differ by 6.0 inhours, the corrected position for $UO_2$ being 124.4 inhours and for U metal 130.4 inhours. By independent tests of so-called "exponential piles" in accordance with the procedure disclosed in the copending application of Enrico Fermi, Serial No. 534,129, filed May 4, 1944, for Nuclear Chain Reacting Systems, it was determined that in a lattice arrangement of the same type as this reactor the difference in $k$ between metal bodies and oxide bodies of the precise size, weight and character used in the stringer was 0.03. Dividing this value by the figure of 6.0 given above, the change of $k$ per inhour is found to be 0.005, which may also be written as 0.5% change of $k$ per inhour, since the actual values of $k$ usually contemplated in these tests are close to unity. In other words, according to this calibration, when the sixteen test pockets of the stringer are occupied by bodies to be compared with bodies previously in such pockets, a control rod position change of one inhour represents a change of 0.5% in the factor $k$ for the cells completed by the test pockets, or in the reproduction factor for an entire reactor embodying the material tested in the stringer pockets.

Where the metal bodies under test in the sixteen pockets differ in weight from standard metal lumps, it is desirable to eliminate from the results the difference in reactivity of the reactor due to such difference in weight, and correction for weight is made as indicated hereinabove. Corresponding correction can be effected where the bodies to be compared with uranium metal are not metallic but are, for instance, uranium oxide or carbide; in such case, calculation should first be made, as will now be readily understood by persons skilled in the art, to determine an equivalent weight of metal (i. e., the amount of metallic uranium that would afford the same thermal neutron utilization in a cell, of graphite and metal, of similar size), which is then corrected. Where oxide bodies, for example, are to be compared with bodies of other batches of the same oxide of uranium, weight correction can be simplified (as in the case of metal comparisons) by plotting a weight correction curve from inhour (critical position) readings for a variety of weights of one batch of the oxide in the pockets.

Reverting to the calibration procedure whereby differences in balance position of the control rod are converted to changes of $k$, it will now be appreciated that changes in inhours may be readily correlated with other properties or characteristics to be investigated. For instance, where stringers of graphite or other material are to be tested for neutron absorption, preliminary comparison may be made between materials of known absorption properties and a relation thus obtained between change of inhours and change of, say, atomic absorption cross section in square centimeters. Likewise, other calibration methods can be used for determining change of $k$ per inhour, as by observing the control rod balance positions for a set of standard metal lumps first without and then with measured quantities of known neutron absorbing materials, adjacent the lumps, and then calculating the difference in $k$ (i. e., $k$ for the test cells of the stringer) represented by the known difference in neutron loss and finally correlating such difference in $k$ with the observed difference in inhours.

With relationships and calibrations of the above described sort ascertained, it is possible to determine accurately the effect on the reproduction factor, or other significant characteristics, of any new batch of material that it is desirable to test. By way of specific example, the following table gives the result of tests on three different batches of material, i. e. metallic uranium of natural isotopic content, identified in the first column of the table as lots numbered 4, 5, and 6 respectively. The tests were made with the reactor specifically described herein, by substituting bodies of the tested material, in each instance, in the sixteen pockets of the stringer. The control rod positions are those of balance, i. e., for an actual reproduction ratio of unity. The next to last column gives the amount (in inhours) and direction of the departure of control rod position from that for the standard metal bodies in the stringer pockets. The last column sets forth the corresponding increase or decrease of reproduction factor that would be characteristic of each lot under test (if used in a reactor), expressed in percent of $k$ as determined by the above calibration for the reactor described herein, viz. $\Delta k\% = 0.5 \times \Delta \mathrm{ih}$.

| Lot No. | Av. Wt. per cell, gr. | Press., 0° C. | Control Rod Position, Cm. | Control Rod Position, Inhrs. | Correction for Press. in Inhrs. | Correction for Weight, Inhrs. | Corrected Control Rod Position, Inhrs. | S ih. | S(r−1) percent |
|---|---|---|---|---|---|---|---|---|---|
| Std | 1,987 | 736.6 | 436.0 | 127.9 | −1.1 | −0.5 | 126.3 | | |
| 4 | 1,976 | 736.6 | 436.0 | 127.9 | −1.1 | −0.4 | 126.4 | +0.1 | +0.05 |
| 5 | 1,809 | 736.7 | 433.05 | 126.5 | −1.1 | +0.5 | 125.9 | −0.4 | −0.20 |
| 6 | 1,834 | 736.7 | 433.00 | 126.5 | −1.1 | +0.4 | 125.8 | −0.5 | −0.25 |
| Std | 1,987 | 736.7 | 435.95 | 127.9 | −1.1 | −0.5 | 126.3 | | |

Note that the standard material is returned to the reactor after each three batches of metal are tested, so that any change in control rod position is noted. If there is a change between the control rod position of one test of the standard batch and the control rod position of a second test of the standard batch, the average of the two readings is taken as standard. Note also that no correction is made for temperature because the temperature varies so slightly between testing the standard and the sample.

By the use of our invention practically any material used in a neutronic reactor may be tested. Thus by the use of a removable graphite stringer similar to stringer 35 but without the metal carrying cells 36, new supplies of graphite may be tested against standard graphite. Also by removing a larger section from the reactor containing several rows of live graphite and substituting various arrangements of graphite and uranium, new types of geometry may be tested. It is also possible to coat the uranium masses with various materials and determine the effect of such coatings on K. From these measurements the effect of coating each uranium mass may be discovered.

Many other uses and changes in our method and apparatus will be apparent to those skilled in the art. We do not wish to be limited to the embodiments of our invention that are described since these are merely illustrative. The scope of the invention is limited only by the attached claim.

We claim:

A method of producing an indication of the relative neutronic purity of a sample of fissionable material with respect to a standard body of fissionable material by utilizing a graphite moderated neutronic reactor having a graphite stringer movable therethrough and in length approximately twice the depth of the reactor, which consists in loading standard bodies of fissionable material in depressions in a first half of the movable stringer outside the reactor; moving the stringer to position the standard bodies in the reactor; balancing the reactor at a predetermined neutron level by positioning a control rod therein; said control rod having a scale to show the depth of penetration of the rod in the reactor; loading the sample bodies of fissionable material in depressions in the second half of the movable stringer outside the reactor; again moving the stringer to position the sample bodies in the reactor while simultaneously removing the first half of the stringer containing the standard bodies outside the reactor; and again balancing the reactor at the said neutron level by again positioning the control rod therein, whereby the difference in the depth of penetration of the control rod as shown by the scale thereon when the standard and sample bodies respectively are in the reactor indicates the relative neutronic purity of the sample with respect to the standard.

References Cited in the file of this patent

UNITED STATES PATENTS 2,288,718  Kallman et al. _____ July 7, 1942

FOREIGN PATENTS 114,150  Australia _____ May 2, 1940
114,151  Australia _____ May 3, 1940
233,011  Switzerland _____ Oct. 2, 1944

OTHER REFERENCES

Anderson et al.: Physical Review 72, pages 16–23 (1947). Report of Work Done in 1943–44.